United States Patent
Hodgson

[15] 3,651,617
[45] Mar. 28, 1972

[54] RECONCENTRATING HYDROSCOPIC LIQUIDS USED IN GAS DEHYDRATION WITH REVERSE OSMOSIS

[72] Inventor: Robert A. Hodgson, Tulsa, Okla.
[73] Assignee: Maloney-Crawford Tank Corporation, Tulsa, Okla.
[22] Filed: June 15, 1970
[21] Appl. No.: 46,257

[52] U.S. Cl............................55/32, 55/171, 210/23, 210/321
[51] Int. Cl.........................................B01d 53/14
[58] Field of Search........................55/29–33, 171–177; 210/321, 23

[56] References Cited

UNITED STATES PATENTS

| | | |
|---|---|---|
| 3,370,636 | 2/1968 | Francis, Jr. et al. ......................55/171 |
| 3,386,912 | 6/1968 | La Zane...................................210/231 |
| 3,246,764 | 4/1966 | McCormack............................210/321 |
| 3,403,522 | 10/1968 | Henry........................................55/31 |
| 3,498,910 | 3/1970 | Mendelson..............................210/321 |
| 3,505,215 | 4/1970 | Bray.........................................210/321 |

Primary Examiner—Charles N. Hart
Attorney—Head & Johnson

[57] ABSTRACT

Hygroscopic liquid used to dehydrate wet gas streams is regenerated by causing the liquid to flow through a reverse osmosis system after which the liquid is stored and/or reused for dehydration.

7 Claims, 3 Drawing Figures

Patented March 28, 1972

INVENTOR.
ROBERT A. HODGSON
BY Head & Johnson
ATTORNEYS

INVENTOR.
ROBERT A. HODGSON
Head & Johnson
ATTORNEYS

RECONCENTRATING HYDROSCOPIC LIQUIDS USED IN GAS DEHYDRATION WITH REVERSE OSMOSIS

BACKGROUND OF THE INVENTION

Hygroscopic liquid including glycol, brines, organic or inorganic liquid, have been or are known to be used as liquid desiccants for dehydrating natural gas streams. Typically, as for example, brine is injected into a contacting tower where it passes in countercurrent or other flow-mixing means, sometimes in a plurality of mixing stages or steps. The spent or water-rich liquid is drawn off of the tower then discarded. In many instances the hygroscopic liquid, such as glycol, is regenerated. In the case of glycol this is accomplished by heating the liquid in a reboiler to drive off the water allowing the lean glycol to be reused in the contacting tower. Likewise, many of the other liquid desiccants require the use of heat to provide effective regeneration. The problem, however, is that many locations for dehydrating natural gas streams make it impractical and in some instances by operation of law, impossible to use any form of fired heat to regenerate the desiccants. For example, many offshore gas systems from an economic standpoint or by law or safety regulation do not permit the use of a fired heat source for any processes connected with the production of hydrocarbons. Additionally, remote and virtually unattended locations cannot use fired heat without a great many built-in safety devices to prevent explosion or waste if the fire should go out.

SUMMARY OF THE INVENTION

This invention relates to a non-direct fired regeneration system for hygroscopic liquid used as desiccants for dehydrating natural gas streams. Typical of such liquids includes those produced from hygroscopic salts or glycols, either ethylene, diethylene, triethylene, or others used in dehydrating gas streams, particularly natural gas streams.

This invention further provides the utilization of hygroscopic liquid in a continuous process which is not affected by the failure of a direct fired heat, is safe for remote and offshore locations to comply with government or other regulations and restrictions, and is economical.

Typical of the area in which this invention may be used is isolated offshore gas producing platforms. A further object of the invention is to provide a gas dehydration process utilizing the phenomena of reverse osmosis to regenerate the desiccant.

A still further object of this invention is to provide a process and apparatus of gas dehydration in which apparatus may be installed at the bottom of the sea in conjunction with other submerged gas well completion techniques.

The invention further provides process and apparatus which utilizes a regenerated hygroscopic liquid solution and which permits the use of the more expensive efficient types of liquid desiccants in a closed cycle system for use in remote operation for long periods of time without attention.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
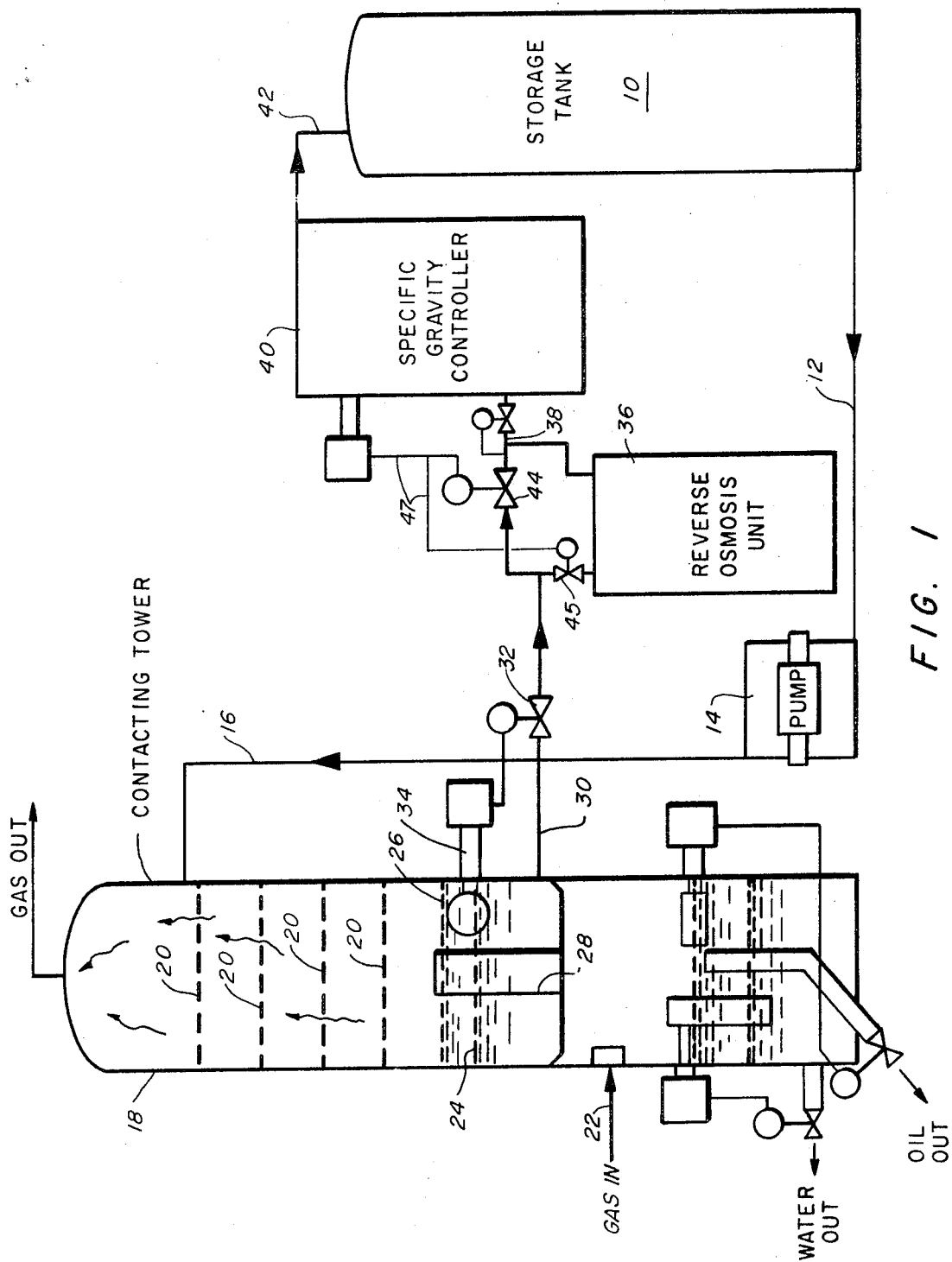
FIG. 1 is a schematic flow diagram describing a typical apparatus of this invention for a brine dehydration system.

Both the operation and the apparatus used and taught herein may be had by referring to the drawings, first to FIG. 1. Brine is pumped from a storage tank 10 through flow line 12 and gas driven pump 14 into flow conduit 16 to the contacting tower 18 where it is caused to pass, as in this example, countercurrent, across trays, stages or contacting zones 20, to a wet gas stream entering through flow line 22. The contacting zones 20 may be any of those well known in the art including, but not limited to, those taught in U.S. Pat. Nos. 2,804,935; 2,804,940; and 2,804,941. The water-rich brine collects below at level 24 while oil or other lighter liquids present in the gas separate and flow thereabove at level 26, the latter being removed through conduit 28 to the lower part of the tower 18 where further separation and removal occurs as is well known to those skilled in the art. A water-rich brine outlet conduit 30 is flow controlled by a valve 32 which in turn is controlled by the float actuated system 34 of the type well known to those skilled in the art. This flow is regulated into a reverse osmosis unit 36 wherein the water within the brine is substantially removed and further caused to flow through conduit 38 into specific gravity controller 40. The outlet therefrom through flow line 42 re-enters the storage tank 10 for reuse and the cycle is repeated. The specific gravity controller operates in such a manner to allow only brine into the chamber 40 if it is of proper specific gravity. When the gravity drops below a desired set point the valve 44 is closed by the gas pressure in line 47 holding the brine in the reverse osmosis unit until its gravity is raised. When the gravity is too high valve 44 is opened closing valve 45 shutting in the reverse osmosis unit 36. The reverse osmosis unit, as used herein, preferably comprise a permeability separation system usually using a plurality of hollow fibers of a selective permeable membrane. A diversity of membranes are known which, to various degrees, have the property of being selectively permeable to different components of different mixtures. Thus, some membranes will pass water while restraining ions. Still others will selectively pass ions or even possess certain selected permeation rates for two or more non-ionic components of fluid mixtures. Reverse osmosis, or ultrafiltration is the most practical application of this type of separation. For example, when a solution is passed on one side of an osmotic membrane and the corresponding solvent is placed on the other side of the membrane, the solvent will pass through the membrane into the solution, the force varying with the character and concentrations involved. The force is the specific osmotic pressure for that solution. When a pressure differential is applied to the solution (opposed to any pressure that may be exerted on the solvent side of the membrane and in excess of the specific osmotic pressure of the system) a "reverse osmosis" or ultrafiltration is effected. In such cases, solvent from the solution is forced through the membrane while the ions are restrained from passing therethrough. In many instances hollow fibers of synthetic, thermoplastic polymeric materials are excellently well suited for use as permeability membranes.

Figure 2:
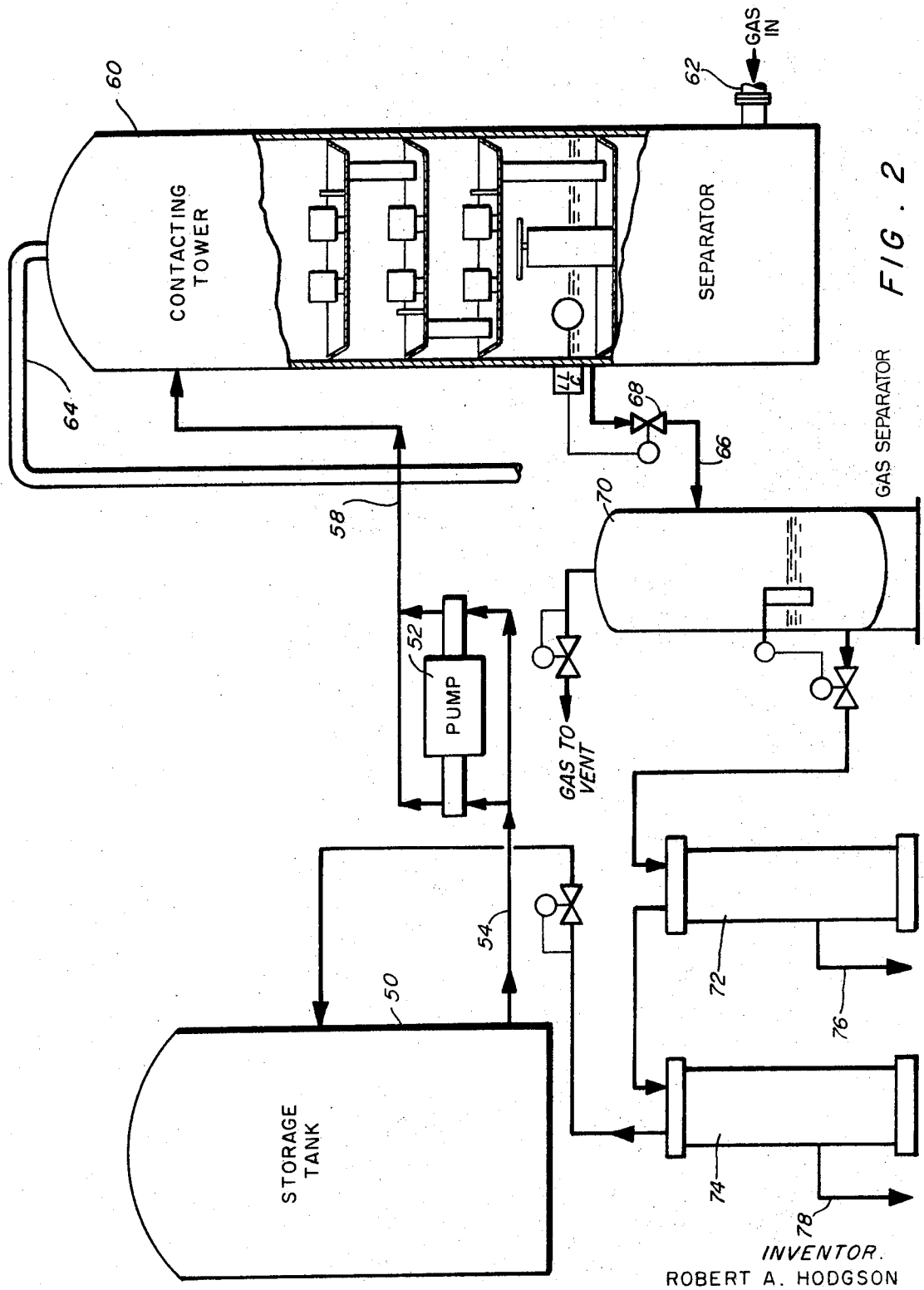
FIG. 2 is a schematic flow diagram describing a typical apparatus of this invention for glycol dehydration systems.

Referring now to FIG. 2, lean glycol of the type well known in the art is stored in tank 50 and caused to flow by virtue of pump 52 through outlet flow line 54, and flow line 58 into a gas liquid contacting tower 60 within which the gas entering through lower conduit 62 passes upwardly in a counter-current relationship utilizing equipment well known to those skilled in the art. Dry gas exits through conduit 64 for further usage. Water-rich glycol collects at the lower end of the contactor 60 and is removed by way of conduit 66, being controlled by valve 68 through a gas separator and a filter 70 and thence into reverse osmosis tube modules 72 and 74 in series. Water is removed through each module through respective outlets 76 and 78. Lean glycol then passes through conduit 80 to the glycol storage 50 where the cycle is repeated.

Figure 3:
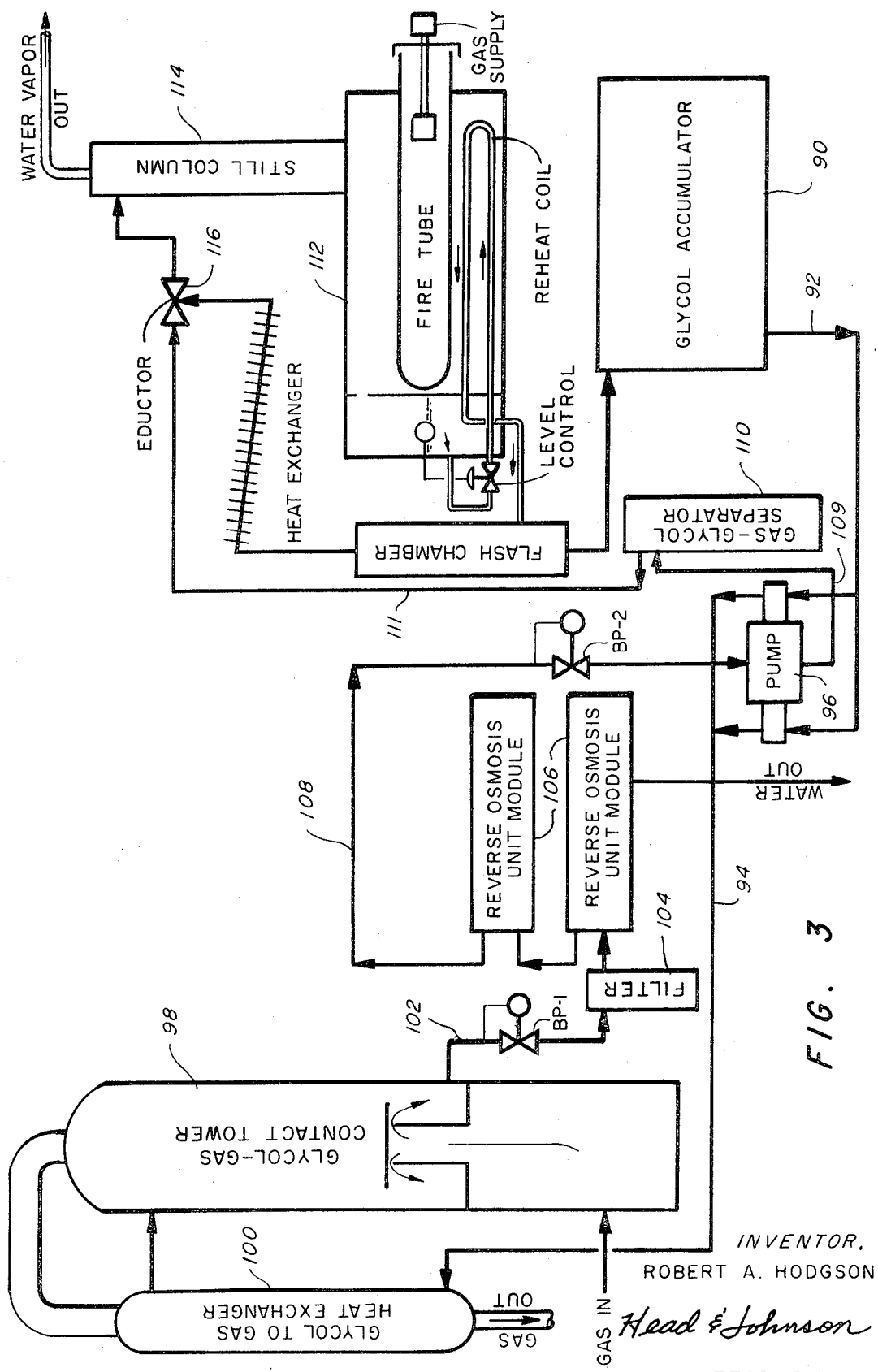
FIG. 3 is a schematic flow diagram of another embodiment of this invention.

The embodiment of FIG. 3 represents a typical glycol dehydration system in use on and offshore. Lean glycol is pumped from the accumulator tank 90 via conduits 92 and 94 through pump means 96. Prior to its entrance into the glycolgas contact tower 98, the lean glycol is passed through a gas to glycol heat exchanger 100 where it enters the upper part of the tower 98 at a reduced temperature, approaching the gas temperature. The contacting of the gas with the glycol in the tower 98 removes water from the gas. Water-rich glycol dropping through the tower is collected on a chimney tray and thence conducted via conduit 102 through a filter 104 to reverse osmosis units 106 which are maintained substantially at the pressure of the contacting tower 98. In the reverse osmosis units 106 water is forced out of the glycol through the osmotic membranes. Preferably a membrane is used that permits not only water but also salt molecules to pass through thereby reducing the salt content of the glycol as well as the water content. This reduces a major operating problem with some dehydrators relative to the deposition of salt on the regenerator fire tubing which reduces heat transfer in the regenerator and destroys fire tubes. The glycol leaving the reverse osmosis units 106 passes by way of conduit 108 through pump 96 to a gas-glycol separator 110 where the gas evolved from the glycol tower is removed and used for fuel gas to fire the fire tube reboiler 112. Glycol from the separator at the reduced separator pressure is conveyed to the still column 114 by the action of eductor 116. Vacuum produced by the eductor is applied to the top of a flash chamber 118 where some of the remaining water within the glycol passing from reboiler 112 is drawn off in the form of vapors to the eductor 116 thus effecting further increase in glycol concentration.

The aforesaid described embodiment of FIG. 3 is particularly applicable to efficiently remove water from the glycol, heatlessly, and thereby reduce the water load on the regenerator or the reboiler. This permits the use of the smaller regenerator requiring less gas for heat regeneration of the concentrated glycol. Of course, this is in addition to the removal of brine or salt from the glycol as heretofore described.

In some instances with regard to the embodiment of FIG. 3, the gas-glycol separator may be placed ahead of the reverse osmosis unit to prevent gas from entering the reverse osmosis unit. The back pressure valve BP-1 is used to reduce glycol pressure from the tower, if necessary, to protect the reverse osmosis unit which ordinarily operates between 1,000 –1,500 p.s.i.g. A second back pressure valve BP-2 may be necessary to hold the pressure on the reverse osmosis unit 106 to an optimum level.

What is claimed:

1. A method of reconcentrating water-rich liquid desiccant comprising the steps of:
   contacting a gaseous stream with a desiccant to form said water-rich desiccant;
   pressuring said desiccant in excess of the osmotic pressure;
   passing said pressurized desiccant to one side of a semipermeable membrane of selective permeability;
   removing water from the other side of said membrane; and
   passing said water lean desiccant to a gas contactor.

2. A method of claim 1 wherein said desiccant is a hygroscopic salt solution

3. A method of claim 1 wherein said desiccant is a glycol of the type ethylene, diethylene or triethylene glycol.

4. Apparatus for reconcentrating water-rich liquid desiccant from a wet-gas contacting means including a reboiler for said liquid to drive off said water by heat, the improvement comprising:
   at least one reverse osmosis module;
   means to flow said desiccant into said module on one side of a semipermeable membrane of selective permeability;
   means to maintain or pressure said desiccant in excess of the osmotic pressure of said membrane whereby a substantial portion of the water in said desiccant passes through said membrane to the other side thereof;
   means to pass said desiccant from said module to said reboiler to remove any remaining water therefrom; and
   removing substantially water-lean desiccant for reuse at said gas contactor.

5. Apparatus of claim 4 including a gas desiccant separator for said desiccant passing from said module to said reboiler.

6. Apparatus of claim 4 including a flash separation chamber and means to pass said substantially water-lean desiccant from said reboiler into said chamber; and
   means to create, in said chamber, a pressure lower than the pressure in said reboiler.

7. Apparatus of claim 5 including a flash separation chamber;
   means to pass said substantially water-lean desiccant from said reboiler into said chamber; and
   eductor means powered by said desiccant flow from said gas-separator to create, in said chamber, a pressure lower than the pressure in said reboiler.

* * * * *